UNITED STATES PATENT OFFICE.

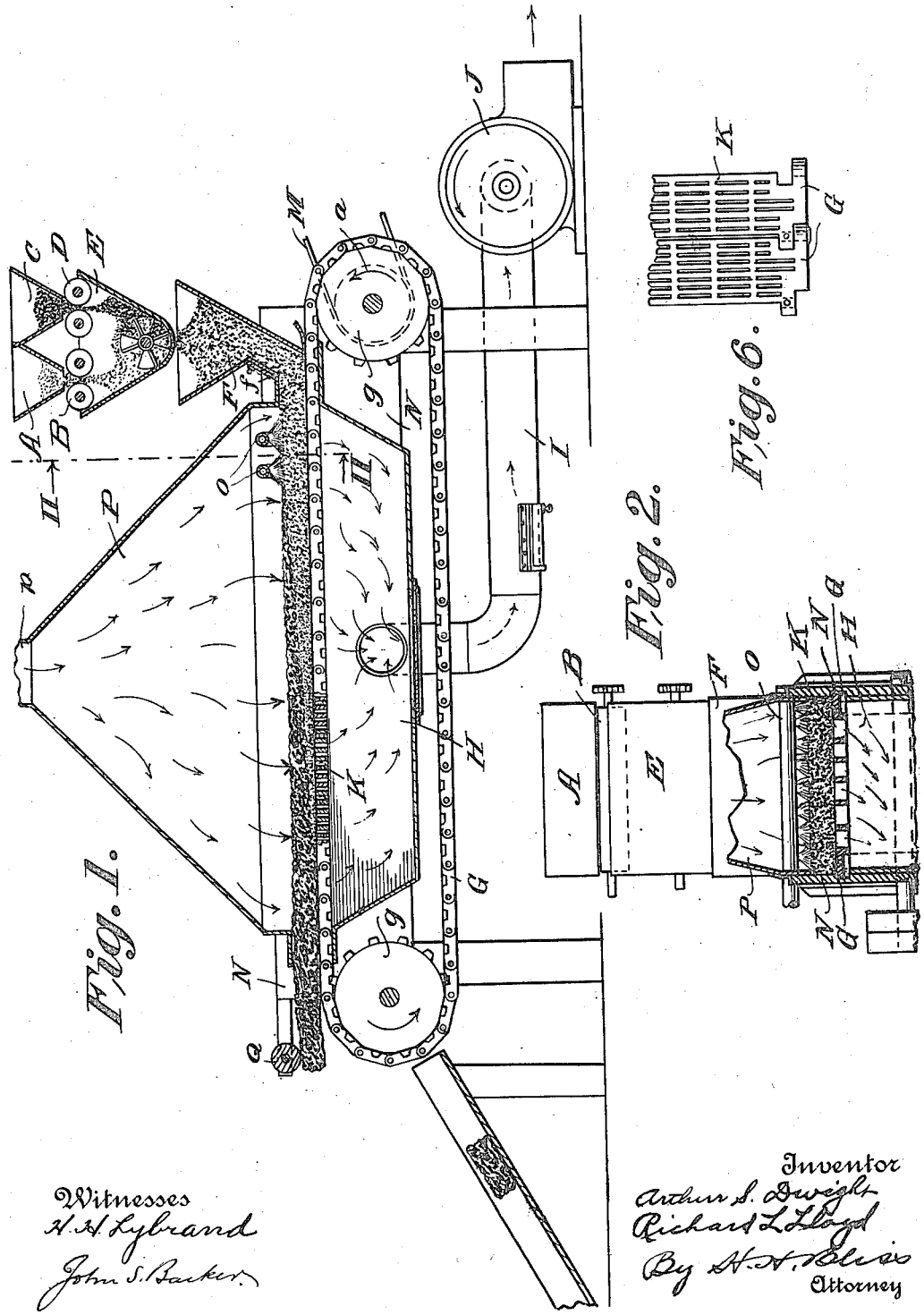

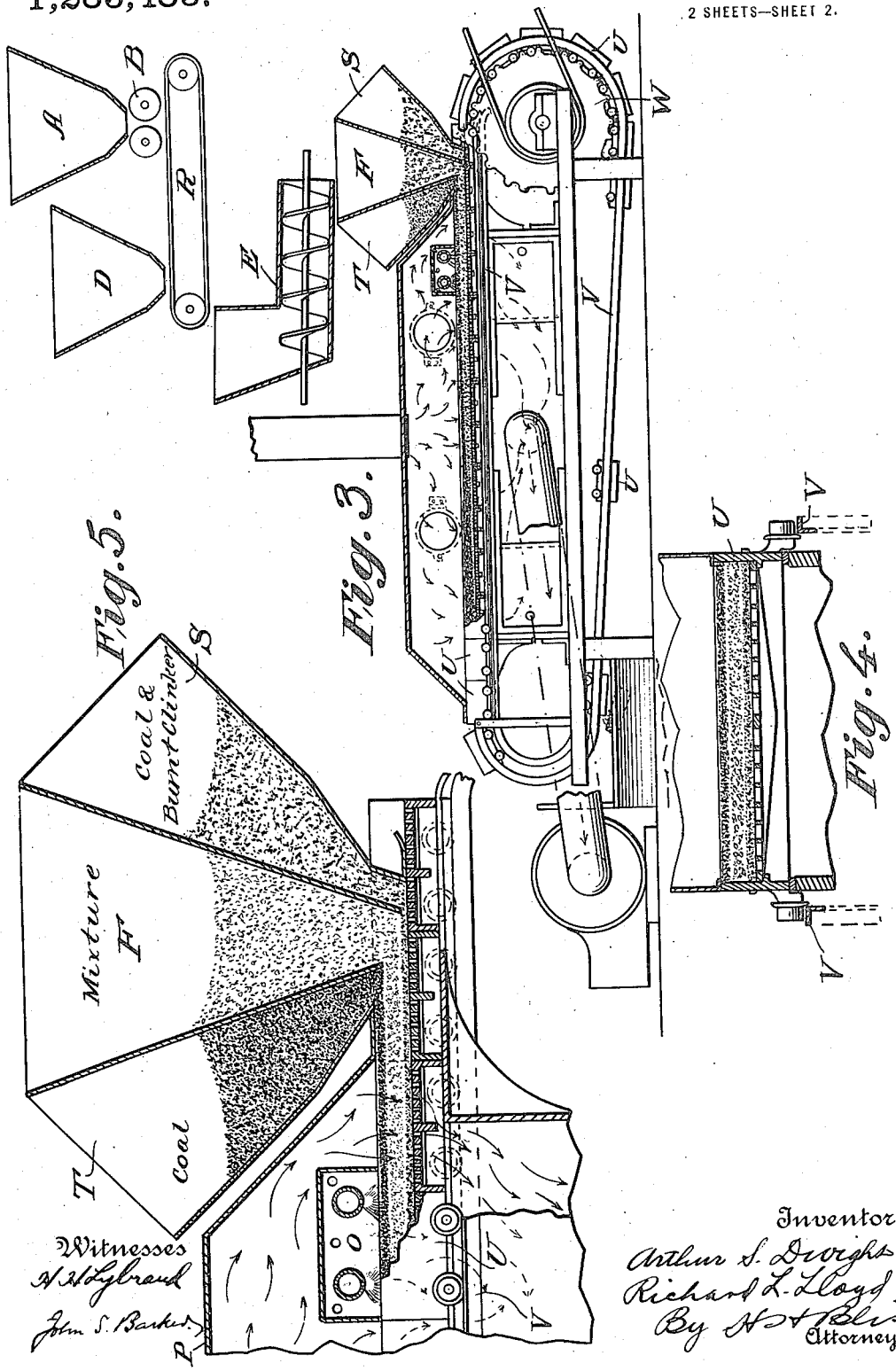

ARTHUR S. DWIGHT AND RICHARD LEWIS LLOYD, OF NEW YORK, N. Y., ASSIGNORS TO DWIGHT & LLOYD METALLURGICAL COMPANY, OF NEW YORK, N. Y., A CORPORATION OF NEW JERSEY.

CEMENT MATERIAL AND METHOD OF PRODUCING.

1,283,483. Specification of Letters Patent. Patented Nov. 5, 1918.

Application filed December 30, 1912. Serial No. 739,358.

*To all whom it may concern:*

Be it known that we, ARTHUR S. DWIGHT and RICHARD L. LLOYD, citizens of the United States, residing at New York, in the county of New York and State of New York, have invented certain new and useful Improvements in Cement Materials and Methods of Producing, of which the following is a specification, reference being had therein to the accompanying drawing.

Our invention relates to the art of producing hydraulic cement and has for its object to treat the initial mass of material from which the cement is formed more economically and thoroughly and in a manner superior to what has been possible by the processes heretofore in vogue, and to thereby secure a novel and superior product.

In one of the methods very commonly employed in the manufacture of cement the reduced raw cement material is fed into a long rotary kiln in which is maintained an intense heat, commonly produced by the combustion of powdered carbonaceous fuel, which is projected, through suitable burners, into one end of the kiln, forming a cone of flame and incandescence products of combustion, to which the material being treated is subjected, and under the influence of which it is converted into the clinker, which on being discharged from the kiln and cooled is ground to form cement. The apparatus employed in the process just referred to is cumbrous, and expensive in its initial construction, as well as in operation and upkeep, while the resulting product is inferior to that of the process constituting the invention which is to be herein described, in that it does not have that uniformity of composition and character throughout, nor possess these desirable physical qualities which characterize the product of our invention. For, notwithstanding the fact that the rotary cement kilns referred to are made long, and the material being treated, as it is slowly fed through the kiln, is agitated and repeatedly turned over and over, nevertheless it tends to accumulate and pile up in the lower portion of the kiln where it is often a foot or more in depth, so that it is not at any time uniformly subjected to the action of the flame and burning fuel within the kiln, it being manifest that the uppermost or exposed particles of the mass are much more intensely acted upon by the flame and heat than are those particles at the bottom of the mass. The tendency of this method of treatment is to form small clinker nodules, balls or masses that are hard in nature and not throughout of uniform physical consistency and chemical constitution.

The raw material usually treated in kilns of this kind is a mixture of limestone and clay; and among the operations which it is sought should take place within the kiln are the driving off of all moisture in the charge—a purely physical result—and the breaking down of the chemical constitution of the ingredients to such an extent as to drive off or eliminate all water of constitution, and all carbonic acid gas which they may contain. From the moment these chemical changes begin to take place other reactions commence and new chemical combinations are formed, resulting in the production of complex silicates; and finally, before the material is discharged, these silicates become agglomerated or sintered into masses forming the cement clinker,—the product of the kiln.

The chemical reactions taking place within the kiln, especially the formation of new compounds such as referred to, like most other chemical combinations, especially those resulting in the formation of crystals or crystal-like bodies, take place more readily and perfectly when the particles throughout which the reactions are taking place are in a state of quiescence, since agitation of the particles tends to retard or interfere with such reactions.

It thus follows that not only does a rotary kiln treatment of cement material tend, by reason of the rumbling, rolling, tumbling and agitating of the material, as has been stated, to interfere with and prevent the complete elimination of those volatile constituents which it is one of the objects of the calcining operation to drive off, but it also interferes with those reactions which result in the formation of such new compounds as are sought to be produced. And such treatment is further objectionable in that, as the material treated becomes plastic and the particles begin to agglomerate and form into clinker, nodules are formed having hard and indurated shell portions which frequently inclose parts of different constituency from the shell parts, being incompletely dehydrated and freed from carbonic acid gas. These nodules tend to increase in size, thus reducing the possibility of the interior portions becoming, first properly calcined and then forming into the complex silicates sought to be produced, while the exterior portions become overburned, excessively hard and refractory and troublesome and expensive to grind.

The product of the rotary kiln treatment is thus a clinker formed of masses which while varying in size are all too small for the most economical handling and treatment—as compared with the product of our invention—are excessively indurated and refractory in nature, and vary from each other in chemical and physical features, so that the cement formed from the grinding of such clinker does not have ideally uniform constituency and characteristics. These results, more or less unsatisfactory, are secured only by an excessive use of heat-producing fuel, the consumption of which takes place external to the treated material so that a large proportion of the heat is not utilized to advantage but escapes, and is lost.

The object of the present invention is to so treat cement-forming material as to effect a high but practically uniform heating thereof throughout the entire mass by means of the consumption of a minimum amount of fuel, which is caused to take place within the mass of material being treated,—in contradistinction to being consumed externally thereto—, and to thereby effect physical and chemical changes, such as the driving off of water, both of association and of constitution, and of carbonic acid gas, and the formation of new complex silicates, in a manner and to an extent, as to completeness and uniformity, which has not, by any process in vogue in the manufacture of cement, been heretofore accomplished; producing a substantially uniform coherent stratum of material, which is highly porous and cellular throughout, is friable and easily ground into cement powder, and which when so ground is susceptible of perfect crystalization or hydration.

The process can be carried out in any one of numerous mechanisms, and we have illustrated in the accompanying drawings two, such as are suitable for this purpose, though we do not wish to be understood as thereby restricting our invention in its useful applications and adaptations to mechanisms of the specific kinds illustrated.

In the accompanying drawings—

Figure 1 is a side elevation, parts being broken away, of an apparatus by means of which the present invention may be carried into effect, no attempt having been made in such drawing to indicate the relative proportions of parts, nor to illustrate details of construction such as, to those familiar with the art will be readily understood and supplied without specific illustration or description, the drawing being largely diagrammatic in character.

Fig. 2 is a vertical section taken on the line II—II of Fig. 1.

Fig. 3 is a view in elevation and also largely diagrammatic in character, illustrating another form of apparatus by which the invention may be carried out, and also steps of the process not shown in Fig. 1.

Fig. 4 is a transverse sectional view taken through one of the independent elements of the holder and carrier for the material in the machine illustrated in Fig. 3.

Fig. 5 is a longitudinal sectional view of the apparatus shown in Fig. 3 taken through the feed hoppers and contiguous parts.

Fig. 6 is a partial top plan view of two of the grate sections or conveyer elements.

Referring particularly to Figs 1 and 2 of the drawings, A designates the lower portion of a hopper or receptacle in which may be placed the rock and other raw material from which the cement is to be produced. This hopper delivers to a crusher B, which may be of any usual or approved type and construction, by which the material is reduced to the desired size for further treatment. C indicates the lower portion of another hopper or receptacle in which is placed carbonaceous material such as coal or coke, and which, as shown, delivers to a crusher D. The finely reduced materials from the crushers B and D pass to a mixing device E where they are commingled. From the mixer the material is delivered, either mediately or immediately, to a hopper or receptacle F which in turn delivers to the mechanism where the calcining and sintering operations take place. It will be understood that the several elements of the apparatus thus far referred to are provided with means for regulating their operations so that the proportions of cement material and pulverized fuel may be regulated to a nicety to suit the working conditions met with, and so that the material delivered to the apparatus where the burning, calcining and sintering takes place can be regulated. It will also be evident that these elements of the apparatus may be more or less widely separated one from the other without in any way affecting the essential principles of our invention.

Referring to the mechanism where the calcining of the material and the formation of cement clinker takes place, H designates an air box connected by a trunk I with a suction fan J or other air-moving device. The upper end of this air box is open and across it moves a perforated support K for the material delivered from the hopper F. This support, as represented, consists of a pair of endless chains G engaging with sprocket wheels $g$ and supporting between them perforated grate bars L. The perforated support for the material thus formed is caused to move slowly in the direction indicated by the arrow $a$ by any suitable driving mechanism, characterized by a drive pulley and belt M engaging therewith. The working portion of the carrier and support for the material moves between side walls N which operate to confine the material while under treatment at its edges. For setting fire to the combustible portion of the charge of material delivery from the hopper F we employ an igniter O that is located adjacent to the exposed surface of the material. This igniter may be of any suitable kind, that illustrated consisting of a pair of gas pipes perforated or provided with burners so disposed as to project a mass of flame upon the surface of the ore sufficient in extent and intensity to thoroughly ignite the material across the entire exposed surface thereof. The igniter is located as close as convenient to the feed hopper F and over the near end of the air box H. A hood P which is easily removable to permit access to parts of the apparatus, is preferably employed, it being of a size to cover the exposed surface of the body of material which at any one time is under treatment, its open end being practically coextensive with the open end of the air box H. It is open at $p$ so that the atmospheric air freely enters the hood, and passes through the bed or stratum of material being treated and the perforated support on which it rests and into the air box H, whence it, now charged with products of combustion from the burning carbonaceous material, and water vapor and carbonic acid gas driven off from the material being calcined, passes to the fan, and thence to the stack or other offtake conduit.

The perforated grate is slowly moved across the open end of the air box H, and as it travels below the hopper F receives a layer of material therefrom. The depth of this layer is regulated and its upper surface made smooth by the front edge plate $f$ of the hopper, which may be made adjustable if desired. Five inches may be assumed as the depth of the stratum of material under ordinary working conditions. Soon after leaving the hopper F the stratum of material is ignited at its upper surface, and the combustion thus started becomes internal to the mass, being induced to gradually advance from the ignited to the opposite surface by the air currents caused by the fan J, these being indicated in the drawings by arrows. The air currents preferably pass in a downward direction through the material, so that they operate to hold the particles thereof quiescent; that is, they prevent any agitation among the particles of the mass, such as would occur should the air move in the opposite direction, or upward, when it would cause more or less of a lifting action and disturbance. This quiescent state of the particles of the material being treated is maintained, although the mass as a whole is being bodily moved, and continues so long as the internal combustion within the mass, caused by the burning of the carbonaceous fuel, goes on, the particles being restrained on the side where the air leaves the mass by the grates K and at the upper exposed surface by the pressure of the down-moving air.

The movements of the parts of the apparatus are preferably so timed that the combustion in any particular portion or body of the material is maintained so long as that portion or body is over the air box H; and during such time the zone of combustion passes from the upper and first ignited surface entirely through the mass of material to the lower surface resting upon the grate K. The amount of fuel, relative to the amount of the cement-forming material, the force of the air currents produced by the fan J, and the speed of the mechanism, are so proportioned and regulated that the combustion of the fuel constituent of the mass is of such intensity as will cause a complete and uniform calcining and clinkering or sintering of the mass of cement-forming material from surface to surface, at about the time the product arrives at the point where it is to be discharged from the machine. The treatment described causes the entire layer of material being treated to form into a substantially continuous coherent sinter or clinker cake, which, however, is easily broken off at the delivery end of the apparatus, a breaking roll Q being employed if found desirable.

It has already been set forth that one of the objects of the present invention is to produce a cement clinker or sinter that is uniform in nature, and whose characteristics after working conditions have once been adjusted can absolutely be determined and maintained. It might be expected in carrying out the process thus far described that the material, at the opposite surfaces would be insufficiently burned, and that for that reason the resulting product would not be uniform in consistency and composition from surface to surface. The reason for this supposition is apparent, namely, that at the exposed surface where ignition takes place, the material is not subjected to so great a degree and so long continued application of the heat, as are the other portions of the mass, while at the same time its temperature will be reduced by contact with the air. At the opposite or lower surface the material rests directly upon a metal grate or support, which is a good conductor of heat, with the result that here also the effect upon the material of the internal combustion taking place within the mass is somewhat diminished.

Therefore, in order to guard against such insufficient treatment of the material at its upper and lower surfaces we have devised the mechanism as illustrated in Fig. 4. This in most of its features is similar in principle to the apparatus illustrated in Figs. 1 and 2. It has a hopper A for the raw material to be treated arranged to deliver to a crusher B. This in turn delivers upon a conveyer R to which also is delivered crushed carbonaceous fuel, which is represented as being supplied from a hopper D. The conveyer R delivers to a mixer E and this in turn to the feed hopper F.

Adjacent to the feed hopper and arranged to deliver to the perforated grate or support for the material is another hopper S adapted to contain a charge of burned cement clinker, with which is preferably mixed a pulverized carbonaceous fuel, such hopper being arranged to deliver a thin layer directly upon the perforated bottom of the carrier or support for the material, which layer acts as a protecting cover between the metallic grate bars and the layer of material to be treated and delivered from the hopper F, preventing the unburned material from coming into direct contact with the material of the grate or support.

T represents another hopper or receptacle in which is placed pulverized carbonaceous fuel, or a mixture thereof and already burned cement material. From this hopper a thin protective layer is fed upon the layer of material to be treated. By this arrangement we are enabled to secure a product practically having the uniform characteristics so much desired.

The supporting and conveying mechanism illustrated in Fig. 4 differs from that shown in Fig. 1 in that the support for the material is made up of a series of independent pallets U. These are each provided with a perforated bottom and are preferably open ended, though provided with side walls, so that when in train they constitute an elongated continuous trough with a perforated bottom and closed sides, but open at the top. These pallets are directed in their course by the tracks and guide pieces V, V so that they are caused to follow an endless path, motion being imparted to them by wheels W.

By disposing the material to be treated in a thin layer such as described it is entirely practicable to carry out the process without the necessity of using strong air currents, and without subjecting the lower portions of the bed or stratum of material to the weight of a deep body of superposed material which would have a tendency to so pack and consolidate the material as to cause the air currents to permeate the mass irregularly forming blow holes and channels, instead of following the interstices or passages naturally formed by depositing a loose pulverulent mass in a thin layer or stratum.

The combustion of the pulverized carbonaceous fuel causes the dehydration of the raw cement material, a complete calcining thereof, and a sintering or agglomerating together of its particles, producing the continuous sinter cake or mass already referred to. During such combustion large quantities of gaseous products are produced, which, with the air that is caused to pass through the material, maintains or keeps the sinter mass being formed in a uniformly highly porous condition, which characterizes the finished product of our process. The burning out of the carbonaceous portion of the charge leaves voids in the mass and causes it to more or less contract or shrink so that the resulting clinker or sinter is friable and easily reduced to powder by the grinding operations which follow the calcining and sintering in order to produce the cement of commerce. This grinding is much more easily effected than is the grinding of the cement clinker made by other processes of which we are aware, since the product of the sintering machine is uniformly cellular and porous, the walls of material separating the pores or voids of the mass being thin and hence easily broken down by the grinding machinery.

What we claim is:—

1. The herein described process of producing hydraulic cement, which consists in finely reducing the raw cement materials, finely reducing a solid carbon fuel, intimately and uniformly commingling the reduced carbon fuel with the cement material, forming a thin stratum of the commingled masses, igniting the fuel component at one surface of the stratum, forcing air through the stratum from the ignited surface while the fine particles are held in quiescence, causing a relatively thin zone of combustion to gradually traverse the stratum from the ignited surface to that opposite thereto, causing the heat generated by the combustion to release the carbon dioxid from the carbonates and at the time of nascency of the earth bases causing the silica to unite with said bases and form the silicates characteristic of cement, and maintaining the conditions of the quiescent mass such as to produce a uniform porosity in the calcined stratum from the bottom to the top thereof.

2. The herein described process of producing hydraulic cement which consists in thoroughly and intimately commingling finely reduced carbonaceous material with pulverized or crushed raw cement material, depositing this mixture in a thin layer upon a thin layer of already burned cement material, covering the said layer of mixed material with a layer containing fuel without the admixture therewith of raw cement material, setting fire to the last said added layer, and passing air through the entire body of material to cause the combustion of the carbonaceous component thereof from surface to surface.

3. The herein described process of producing hydraulic cement which consists in thoroughly and intimately commingling finely reduced fuel material with finely reduced raw cement material, depositing this mixture in a thin layer pervious to air, covering said layer of mixed material with a thin layer of slowly-burning fuel, setting fire to the said covering fuel layer, and passing air through the entire body of material to cause combustion of the fuel content of the mixture and the sintering of the cement-forming material.

In testimony whereof we affix our signatures, in presence of two witnesses.

ARTHUR S. DWIGHT.
RICHARD LEWIS LLOYD.

Witnesses:
  JOHN KNOX,
  WILLIAM J. HOLLEN.